United States Patent [19]
Mitchell et al.

[11] Patent Number: 6,166,732
[45] Date of Patent: Dec. 26, 2000

[54] DISTRIBUTED OBJECT ORIENTED MULTI-USER DOMAIN WITH MULTIMEDIA PRESENTATIONS

[75] Inventors: Don P. Mitchell; Steven M. Drucker, both of Bellevue; Kirk J. Marple, Redmond; Manny Vellon, Bellevue, all of Wash.

[73] Assignee: Microsoft Corporation, Redmond, Wash.

[21] Appl. No.: 09/028,545

[22] Filed: Feb. 24, 1998

[51] Int. Cl.[7] .................................................. G06F 9/00
[52] U.S. Cl. ........................ 345/329; 345/356; 709/303
[58] Field of Search ................................... 345/329, 330, 345/335, 339, 348, 349, 355, 356, 357, 302; 709/203, 204, 217, 218, 303

[56] References Cited

U.S. PATENT DOCUMENTS

| | | | |
|---|---|---|---|
| 5,680,619 | 10/1997 | Gudmundson et al. | 717/1 |
| 5,802,296 | 9/1998 | Morse et al. | 709/208 |
| 5,878,415 | 3/1999 | Olds | 707/9 |
| 5,907,704 | 5/1999 | Gudmundson et al. | 717/1 |
| 5,926,179 | 7/1999 | Matsuda et al. | 345/355 |

*Primary Examiner*—Crescelle N. dela Torre
*Attorney, Agent, or Firm*—Ipsolon LLP

[57] ABSTRACT

Updating of local object databases at client computers, dynamic inheritance, and event notification methods cooperate to provide a persistent object oriented multi-user domain capable of supporting multimedia presentation features for large numbers of users over conventional networks like the Internet. This includes distributing the objects of such a domain between a server and multiple clients and providing the objects with multimedia presentation features. Such a domain includes the persistence of conventional text-based MUDs and MOOs while also giving users the ability to vary or control a wide range of object attributes and properties. As a result, multimedia (e.g., graphical) presentation capabilities are combined with persistence and variability features of text-based MUDs and MOOs to provide a rich, dynamic, multimedia virtual world environment suitable for standard networks.

13 Claims, 13 Drawing Sheets

DISTRIBUTED OBJECT ORIENTED MULTI-USER DOMAIN WITH MULTIMEDIA PRESENTATIONS

FIELD OF THE INVENTION

The present invention relates to object oriented multi-user domains and, in particular, to distributing the objects of such a domain between a server and multiple clients and providing the objects with multimedia presentation features.

BACKGROUND AND SUMMARY OF THE INVENTION

A virtual world represents a real or imaginary place using graphics, images, video, force feedback, and audio data to define a representation of the place on a computer for one or more users. Typically, the virtual world enables multiple users to simultaneously perceive and interact with the virtual world and with each other through different computers that are connected by a network.

Large-scale virtual worlds have been developed for two different kinds of systems: military simulation networks and text-based multi-user worlds or domains known as MUDs. A military simulation network known as SIMNET is based on vehicle and flight simulators that generate real-time 3-D images of a virtual world. A peer-to-peer network protocol allows simulators to place other users' vehicles and projectiles during virtual battle simulations.

A distinction of such a military simulation network is that complete graphical representations are transmitted to all users simultaneously. While transmitting complete graphical representations in applications such as military simulation can require extensive network bandwidth, transmission of complete graphical representations is also used in lower bandwidth applications such as VRML. It will be appreciated, however, that with the bandwidth requirements of a modeling language such as VRML it does not have a way to provide simultaneous full-featured control to large number of users.

Text-based MUDs maintain long term persistent worlds on a central server that is accessed via clients. An object oriented MUD, referred to as a MOO, is a network database server that stores text objects having properties and methods. The topology of the space in a MOO is defined by room objects that represent discrete locations and are interconnected by portal objects. Objects in a MOO can also represent things located in a room, and objects called players or avatars represent the users' characters in the world. Users in the same room are able to talk by typing text and reading the text that others type.

Text-based MUDs and MOOs are capable of providing a rich virtual world experience, but that experience could be further enhanced by graphical and other multimedia presentation characteristics (e.g., graphics, audio, force feedback, etc.). A difficulty is the volume of data required to provide a virtual world experience simultaneously to multiple users, particularly large numbers of users. While even a server of modest capability (e.g., 100 MHz Pentium processor) is capable of supporting a text-based MUD or MOO for up to about 300 users, a multimedia MUD or MOO would require significantly greater server processing power and significant network bandwidth as well.

Some graphical virtual world systems, including graphical chat systems, overcome the server power and network bandwidth requirements by requiring that much of the virtual world be immutable and transmitted to the user's client in an initial download. Subsequent updates that are transmitted from the server to the clients are of only limited feature changes, such as changing positions of entities or objects within a fixed space. Some multi-user 3D games (e.g., Doom, Duke Nukem, Quake, etc.) utilize such multi-casting of player-state messages to provide fast action performance. However, these games lack the persistence of text-based MUDs and MOOs in which user characteristics, such as the attributes and properties of entities controlled by a user, are maintained in a server database as a part of the MUD or MOO. By fixing much of the virtual world and by lacking user entity persistence, such multi-user games lack the richness available within a MUD or MOO virtual world environment.

In accordance with the present invention, therefore, a database of objects distributed between a server computer and multiple client computers supports an object oriented virtual world environment (VWE) with multimedia presentation features. It will be appreciated that a VWE in this context is not limited to the recreational applications, such as multi-user games or chats that are associated with MOOs. A VWE in this context is also applicable to multi-user collaboration in simulations, designs, or modeling, multi-user participation in presentations or demonstrations, as well as other non-recreational applications.

A primary database is maintained on the server and includes at least one entry for each object disposed within the VWE. Typically, each client has an object that functions as the point of access to the database for the user of the client. In a VWE implementation the point of access object for each client is an avatar (i.e., a virtual being or entity) that is associated with the user.

A copy of the portion of the VWE that is immediately accessible to the avatar is maintained on the user's client as a local database. In one implementation, the accessible region of the virtual world is the avatar itself, the avatar's location (e.g. the room the avatar is in), objects in the avatar contents (e.g., what the avatar is carrying), and objects in the contents of the avatar's location (e.g., things in the same room as the avatar). If any of these accessible objects is an open container, its contents is also included in the accessible set. The server marshals these accessible objects to the avatar client when a user logs into the system and activates an avatar or when an avatar changes location to a new room.

The local database contains an entry for each object that is disposed within a bystander region of, for example, the user's avatar object. A change in a property of a selected object caused by one of multiple other users is transmitted to the server that maintains the world database. The world database is updated by the server computer to include the change in the property of the selected object, and affected objects disposed in the bystander region of the selected object are determined.

The change in the property of the selected object is then entered in the local database maintained by the client computer of each user associated with an affected object. This change is conveyed by the server computer to each such client computer. Thus, the change is provided for the users who are associated with affected objects. Further, the change in the property of the selected object is displayed by the client computer of each affected object that senses the change and is being displayed.

Each entry in the local database and in the world database specifies a plurality of properties and a type for the associated object disposed within the VWE. In one implementation, the base types for an object disposed within the VWE an avatar, an artifact, a portal, or a room. Furthermore, the plurality of properties for each object disposed within the VWE comprises at least one of a name, a geometry, an owner, a location, and a contents list. Each object disposed within the VWE that comprises a container preferably includes a content property and is identified as either an open container or a closed container. An object included in the contents list of a container is not sensed by objects disposed within the bystander region of the container unless the container is identified as an open container.

A conventional software object provides software services, such as methods or properties, that are accessed by one or more interfaces. A method is typically a function or procedure that performs a specific action and is called via a corresponding interface. A property is typically information or data and is also called via a corresponding interface. Conventional objects include the characteristic of interface inheritance in which the definitions of the methods that an interface supports may be inherited by another interface. The interfaces may be of different objects that may or may not be of the same class of objects. An object supporting an inherited interface can be treated like the object from which the interface is inherited. Such objects may be implemented by or in accordance with many object-oriented programming tools or models including, for example, the component object model (COM).

An interface of an object may not be changed once the design and implementation of the interface is complete and the object is established, distributed, or promulgated for general run-time use. Adding new services to or modifying existing services in such an object requires that a new interface be defined in a design-time operation. The new interface would then be distributed or promulgated for general run-time use. The new interface may inherit services from an existing interface, but the new interface remains distinct and has a unique identifier. Despite interface inheritance, therefore, interfaces remain static once they have been established, distributed, or promulgated for use at run-time.

An implementation of the present invention provides, therefore, that object services like methods or properties are provided to or inherited by objects dynamically during run-time. This dynamic inheritance may be provided within the context of an object model, such as the Component Object Model, that supports only design-time inheritance. As applied in a virtual world environment, for example, dynamic inheritance can provide users with increased levels of interaction or control.

In a method of providing dynamic inheritance, hierarchical relationships are defined between multiple objects such that each object references or is referenced by another object. One of the objects is a root object that is referenced by at least one other object but that does not reference another object. A call is made for a particular service (e.g., a method or property) at a selected object. The service is provided directly from the object whenever the service is available therefrom.

Whenever the selected service is unavailable at the selected object, the call is passed to a referenced object (i.e., an object that is referenced by the selected object). The service is provided directly from the referenced object whenever the service is available therefrom or the call is passed to yet another referenced object until the service can be provided. The call may be passed to multiple successive referenced objects until the call reaches the root object, which either provides the service or the service is deemed unavailable.

Another aspect of dynamic inheritance is that an object, such as the root object, may include one or more methods for adding or otherwise changing the methods or properties available from that object. The changes in the methods or properties may be made at run-time, after the object has been otherwise fixed or established.

In one implementation, the interface includes an AddMethod method that adds a designated method to the interface at run-time to make the method available from the interface. Similarly, the interface includes an AddProperty method that adds a designated property to a designated interface at run-time to make the property available from the interface. An InvokeMethod method allows a user to execute the designated method, and other methods can allow other access to and control over the methods and properties. Methods and properties available for implementation or access by these dynamic inheritance methods may be in a dynamic inheritance listing, such as a table, that indicates the names of the methods and properties, defines the services they provide, and includes unique identifiers for them.

Further in accordance with an implementation of the present invention, a dynamic or latebound event mechanism provides event mechanism operation according to associational relationships among objects. In addition, objects may be responsive to event notification methods that are not initially within the original object definition, thereby allowing the event notification methods to be inherited by objects dynamically during run-time. This latebound event mechanism and dynamic inheritance may be provided within the context of an object model, such as the component object model, that supports only design-time interface inheritance. As applied in a virtual world environment, for example, latebound event mechanism and dynamic inheritance can provide users with increased levels of interaction or control.

In applying the latebound event mechanism of this invention to a virtual world environment, for example, the objects may correspond to the entities that would arise within the virtual world environment. The objects have associational relationships primarily representing the physical or corporeal distinctions between entities. One implementation utilizes the associations Self, Contents, and Peer. Each typical being or article entity is its own Self relative to and separate from other entities. The space or room of the virtual world environment has those entities as its contents and hence has a Contents association. Typical being or article entities are Peers of each other within a space or room. Another aspect of this particular implementation is that entities are capable of containing one or more other article entities. While such a Container entity would also be a Peer of the other entities, it is assigned to an associational class Container to reflect its functionality.

Event notification methods are promulgated among the objects corresponding to the entities in a sequence based upon the associational relationships between the entities. For an event fired or triggered with regard to one of the entities within the virtual world environment, an event notification method is passed to any objects within any Container entity before event notification methods are promulgated to objects of other entities. An event notification method is then passed to objects within the object corresponding to the Content entity. Event notification methods are then passed successively to the objects corresponding to the Self and any Peer entities.

The event notification methods relating to the Container, Contents, Self, and Peer entities may be designated OnContainerFoo, OnContentsFoo, OnFoo, and OnPeerFoo, respectively, where "Foo" is the name of the event. Each event notification method can have particular functionality according to the particular event and the entity receiving the notification.

This sequence of event notification methods provides propagation of events in a manner that reflects common causal sequences to improve the appearance of reality provided by the virtual world environment. Passing the first event notification method to the object corresponding to any Container entity has the effect of allowing the method to be applied to any container entity that has a controlling effect on another entity (e.g., any "contained" entity). For a similar reason the event notification method is passed next to the Content entity. Subsequently passing event notification methods to the Self entity and the Peer entities provides an event sequence that represents the propagation of causal effects from an event and thereby provides an improved representation of a virtual world environment. This event notification may be utilized with or without dynamic inheritance.

The updating of local object databases at client computers, dynamic inheritance, and event notification methods of this invention cooperate to provide a persistent object oriented multi-user domain capable of supporting multimedia presentation features for large numbers of users over conventional networks like the Internet. This includes distributing the objects of such a domain between a server and multiple clients and providing the objects with multimedia presentation features. Such a domain includes the persistence of conventional text-based MUDs and MOOs while also giving users the ability to vary or control a wide range of object attributes and properties. As a result, multimedia (e.g., graphical) presentation capabilities are combined with persistence and variability features of text-based MUDs and MOOs to provide a rich, dynamic, multimedia virtual world environment suitable for standard networks.

Additional objects and advantages of the present invention will be apparent from the detailed description of the preferred embodiment thereof, which proceeds with reference to the accompanying drawings.

DETAILED DESCRIPTION OF PREFERRED EMBODIMENT

Figure 1:
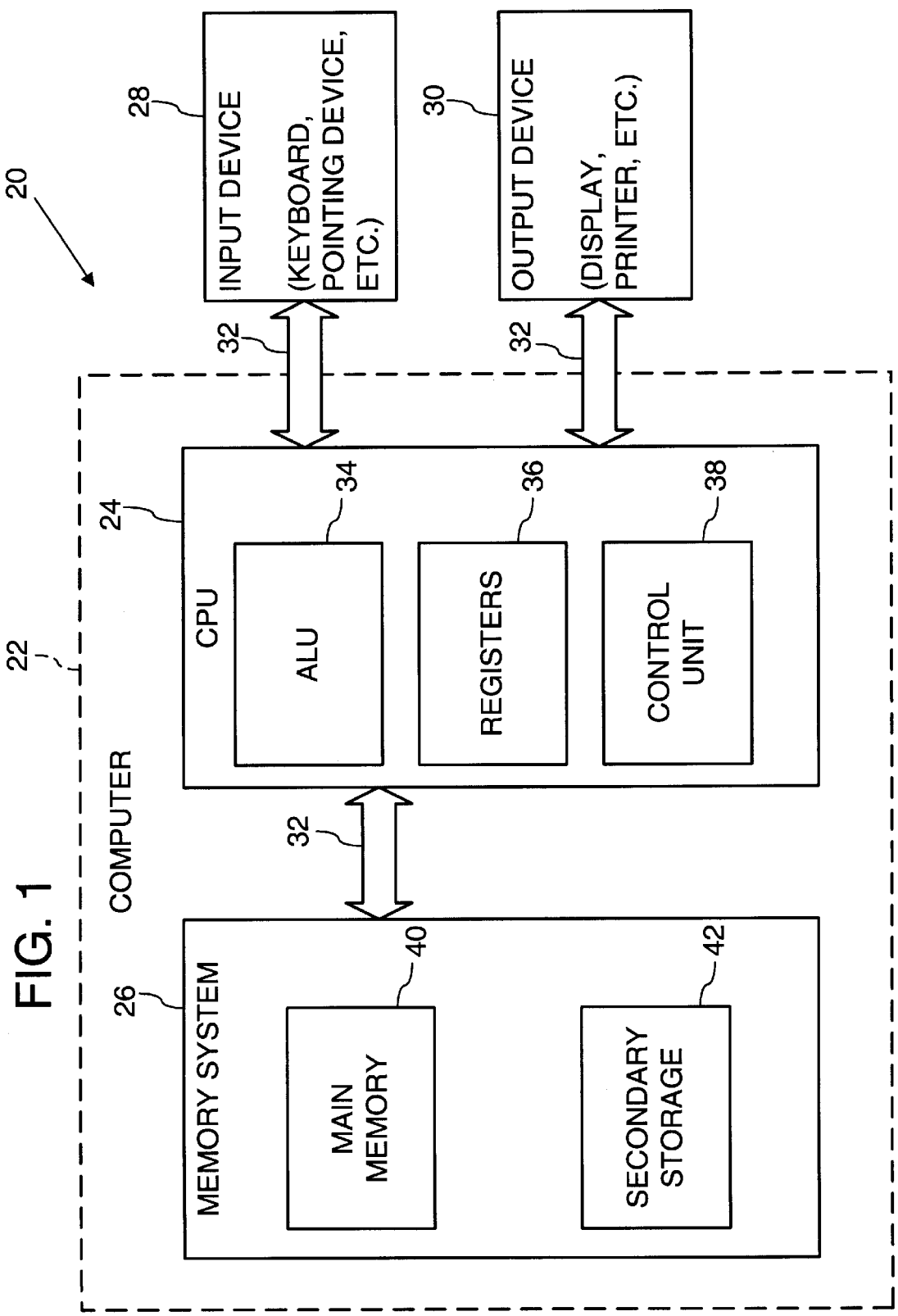
FIG. 1 is a block diagram of a computer system that may be used to implement the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Figure 2:
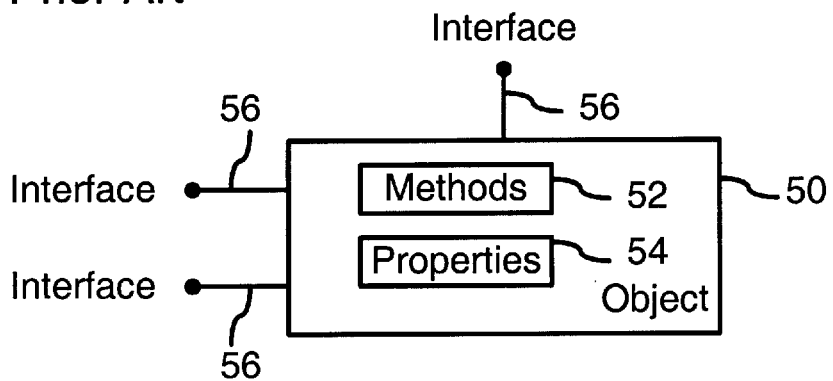
FIG. 2 is a block diagram of a prior art interfaced software object.

FIG. 2 is a block diagram of an exemplary prior art interfaced software object 50 that provides software services such as methods 52 or properties 54 that are accessed by one or more interfaces 56 (multiple shown). A method 52 is typically a function or procedure that performs a specific action and is called via a corresponding interface 56. Properties 54 (also referred to as states or attributes) typically are information or data and are called via a corresponding interface 56. Object 50 is implemented in a server that, for example, may be a dynamic link library utilized by software program or may be an entirely separate executable process.

Each object 50 is an instance of a specific class of related objects. Exemplary object 50 also includes the characteristics of encapsulation, polymorphism, and inheritance. Object 50 encapsulates its properties 54 so each property 54 is accessed only through one of methods 52, thereby protecting the properties (or data) from inappropriate access and errors that can arise therefrom. Object 50 supports polymorphism in that object 50 may present to a software client an interface or a method definition that appears to the client to be the same as an interface or a method definition of another object in a different class. Such interfaces or method definitions of different objects may appear the same to the client of even if the resulting methods have different implementations.

And object 50 also includes interface inheritance in which the definitions of the methods that object 50 supports may be inherited by another object. Interface inheritance simplifies implementation of polymorphism because an object supporting an inherited interface can be treated like the object from which the interface is inherited. Object 50 may be implemented by or in accordance with many object-oriented programming tools or models including, for example, the component object model (COM). COM is a foundation for object oriented technologies such as OLE and ActiveX utilized by Microsoft Corporation and others. By way of example, the following description is made with reference to an object 50 implemented according to COM, but is similarly applicable to other object-oriented programming tools or models of similar characteristics.

Interfaces 56 of object 50 may not be changed once object 50 is established, distributed, or promulgated for general use at run-time. Adding new services to or modifying existing services in such an object 50 requires that a new interface be defined. The new interface may inherit services from an existing interface, but the new interface remains distinct and has a unique identifier. As a result, interfaces 56 are static. While being a limit on the extensibility of objects, static interfaces provide stability and predictability in the use of objects.

Figure 3:
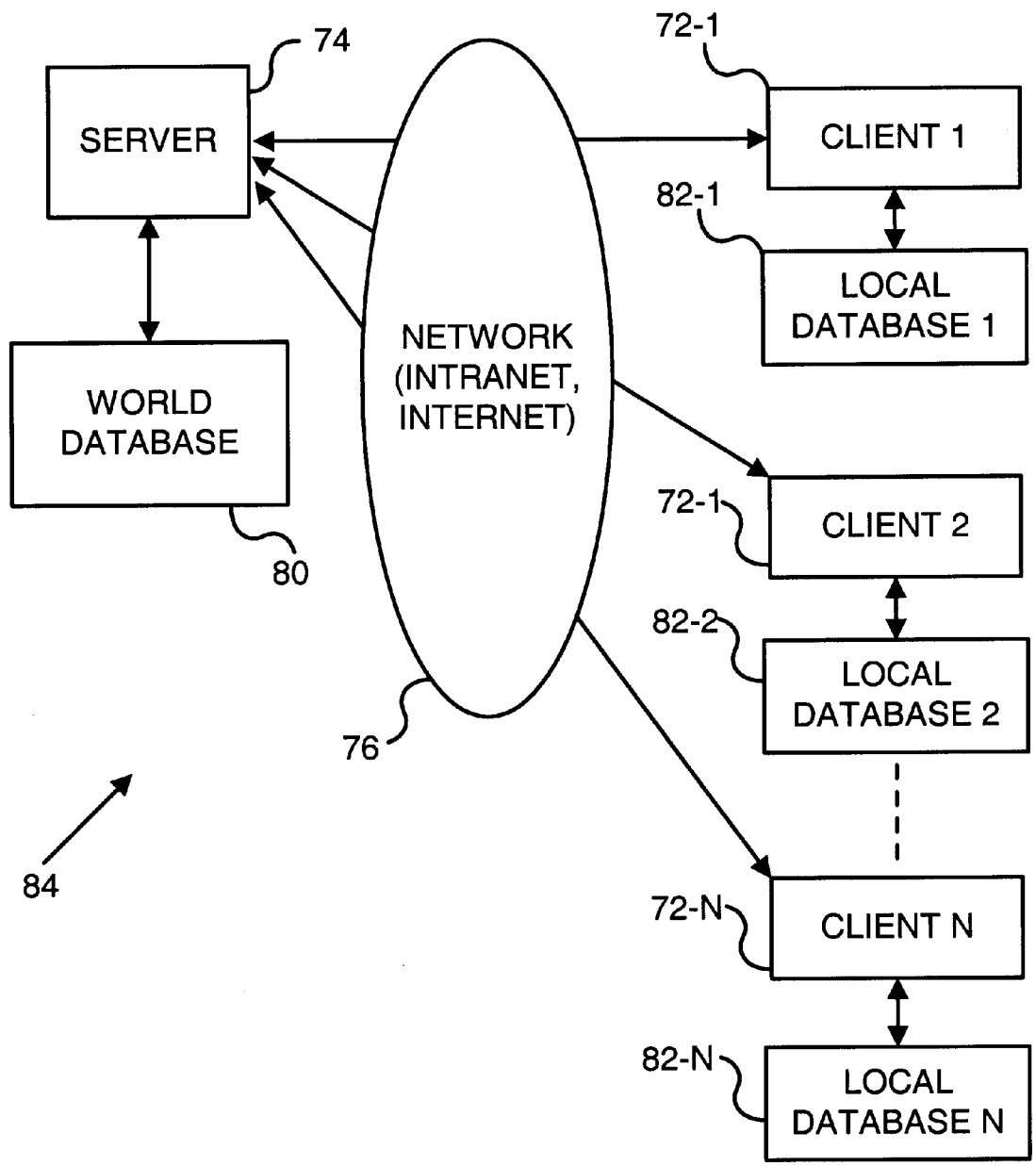
FIG. 3 is an exemplary view of the client-server architecture showing the world database maintained by the server computer, and local databases maintained by each of n client computers.

FIG. 3 is a block diagram illustrating a client-server architecture as an operating environment for a distributed object database according to the present invention. Multiple client computers or clients 72 are in communication with a server computer or server 74 via a network 76, such as a LAN, WAN, intranet, or the Internet. Clients 72 and server 74 have, for example, the basic configuration illustrated in FIG. 1, but may include component variations as is known in the art. As a distributed object database, server 74 maintains a central or world object database 80 while clients 72 maintain local object databases 82. World object database 80 and local object databases 82 together form a distributed object database 84.

For purposes of illustration, distributed object database 84 will be discussed with reference to a representation of an interactive virtual world environment (VWE) or domain. The VWE represents a real or imaginary place using graphic and audio data that are presented to a computer user. World object database 84 comprises objects that correspond to particular types of entities or articles within the environment. It will be appreciated, however, that this illustration does not limit the applicability of dynamic inheritance between interfaces to a VWE and that dynamic inheritance of this invention can be used with interfaces and objects for other representations, models, or schemes.

Figure 4:
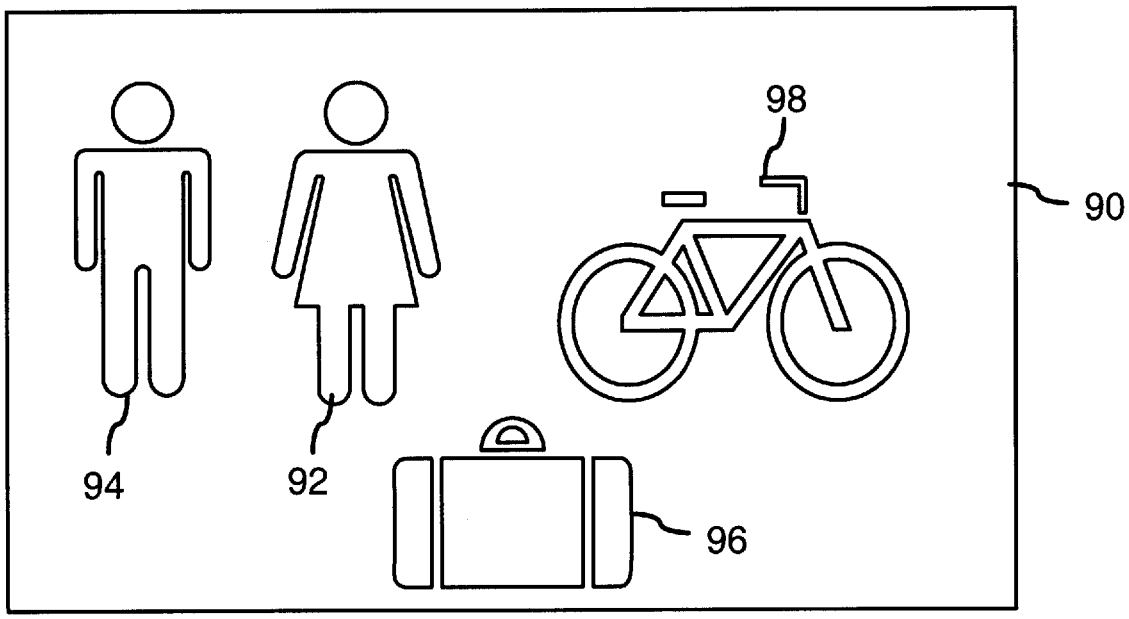
FIG. 4 is a schematic illustration of an exemplary area or space or room within a virtual world environment.

FIG. 4 is a schematic illustration of an exemplary area or space or room 90 within a virtual world environment that represents a real or imaginary place using graphic and audio data that are presented to a computer user. Room 90 may be rendered on a display (e.g., display 30) or may represent information or data held within a memory system (e.g., memory system 26). Room 90 has within it several items or entities including first and second avatars 92 and 94 that each represents a different user, a container article or artifact 96 that can hold or contain other articles or artifacts or entities (none shown), and another article or artifact 98 that is not a container for holding other entities. In this regard, entities are the graphical beings, articles, and even space or room within the virtual world environment, as well as the underlying objects and interfaces for implementing them.

World database 84 maintains a complete and centralized representation of the VWE and includes all objects disposed therein. A first client 72-1 maintains a first local database 82-1, which includes a subset of the information contained in world database 80. First local database 82-1 need only contain those objects that may potentially affect objects associated with first client 72-1. A second client 72-2 maintains a second local database 82-2 that contains information about objects that may potentially affect objects associated with that client, and thus may be different in its information content than first local database 72-1. Moreover, server 74 is shown coupled to an N-th client 72-N having an N-th local database 82-N, to indicate that an indeterminate number of other clients can be coupled to server 74 for interaction in the VWE.

Portions of world database 84 maintained on server computer 74 are downloaded to each of multiple individual client computers 72 and are included in each of multiple corresponding local databases 82. Objects in the local databases 82 may be selected by a user or rendered by an application on a display associated with the corresponding client 72. The user may view and manipulate the objects, e.g., by adding, deleting, or moving the objects within the VWE. Manipulation of or changes to objects in the local databases 82 are communicated to the world databases maintained on the server computer 74. Updates to the world database 84 due to changes at the client computers 72 are handled automatically and dynamically by server computer 74.

The local database 82 maintained by each client computer 72 corresponds to the portion of the VWE that is within the potentially immediate perception of one or more objects associated with the user (e.g., avatar 92). The remainder of the world database 84, which corresponds to the remaining portion of the VWE that is outside the potentially immediate perception of a user's avatar, is of no consequence to the user and is not maintained in the local database 82 on that userr's client computer 72. Accordingly, changes to the VWE represented by world database 84 are provided to the local databases 82 of users with associated objects (e.g., avatars) that may potentially sense the changes. The local databases 82 of users with associated objects (e.g., avatars) that cannot potentially sense the changes are not updated with changes to the VWE represented by world database 84.

For example, a user can move an object (such as avatar 92) that is associated with the user from an old location (such as room 90) through a portal to a new location (such as a connected room). This will cause server computer 74 to update local database 82 on the client computer 72 of the user with the information for portraying the other objects that the user's object (avatar 92) can potentially sense in the new location. Further, client computers 72 of users associated with other objects in the old and new locations will receive a selectively determined update that depicts the potential presence or absence of the moved object. A client computer containing an entry for an object in its local database following such an update may sense and display the object without further communication from the server computer.

Further, the server can actually comprise a network of distributed servers to scale resource capacity as necessary to efficiently administer the world database. The use of distributed servers to administer the world database would thereby provide dynamic scaling of resources to match the number of users participating in the VWE. Also, another feature of the claimed invention is that the server can anticipate the need for an update to a particular local database, so that synchronous "handshakes," which would require frequent bidirectional exchanges between the clients and the server, are dramatically reduced, and computational and data transmission resources of the server and client, and of the network may be more efficiently employed. However, not all data need be marshalled. Large, immutable data at like texture maps, sound files, and geometric models may be referred to by network addresses (e.g., URLs), and the server or clients may download them over a network (e.g. the Internet).

The present invention incorporates some of the more desirable characteristics of a MUD and a client-server architecture, so that an extremely extensible VWE can be presented to the user. The server computer administers a world database that contains the properties for each object associated with all of the users. Further, when a change occurs in the VWE, the server computer updates the VWE representation on the client computers only for the users that are affected by the change in their "bystander region," i.e., only for a change that an object such as an avatar that is associated with a user can potentially sense. Also, the ability of a particular object to sense a specific type of change in the VWE is determined by the properties of the object that are contained in the local database.

Accordingly, the present invention solves the problem of reducing server computational and data transmission resource demands, by only providing updates of a changed object to clients associated with objects that include the changed object within their bystander regions. Moreover, the object based VWE of the present invention is very expandable so that it can accommodate an extremely large number of users, spread throughout a number of different regions or rooms in the VWE.

An implementation of the present invention further provides that object services like methods or properties are provided to or inherited by objects dynamically during run-time. This dynamic inheritance may be provided within the context of an object model, such as the Component Object Model, that supports only design-time inheritance. As applied in a virtual world environment, for example, dynamic inheritance can provide users with increased levels of interaction or control.

In a method of providing dynamic inheritance, hierarchical relationships are defined between multiple objects such that each object references or is referenced by another object. One of the objects is a root object that is referenced by at least one other object but that does not reference another object. A call is made for a particular service (e.g., a method or property) at a selected object. The service is provided directly from the object whenever the service is available therefrom.

Whenever the selected service is unavailable at the selected object, the call is passed to a referenced object (i.e., an object that is referenced by the selected object). The service is provided directly from the referenced whenever the service is available therefrom or the call is passed to yet another referenced object until the service can be provided. The call may be passed to multiple successive referenced objects until the call reaches the root object, which either provides the service or the service is deemed unavailable.

Further in accordance with an implementation of the present invention, a dynamic or latebound event mechanism provides event mechanism operation according to associational relationships among objects. In addition, objects may be responsive to event notification methods that are not initially within the original object definition, thereby allowing the event notification methods to be inherited by objects dynamically during run-time. This latebound event mechanism and dynamic inheritance may be provided within the context of an object model, such as the component object model, that supports only design-time interface inheritance. As applied in a virtual world environment, for example, latebound event mechanism and dynamic inheritance can provide users with increased levels of interaction or control.

In applying the latebound event mechanism of this invention to a virtual world environment, for example, the objects may correspond to the entities that would arise within the virtual world environment. The objects have associational relationships primarily representing the physical or corporeal distinctions between entities. One implementation utilizes the associations Self, Contents, and Peer. Each typical being or article entity is its own Self relative to and separate from other entities. The space or room of the virtual world environment has those entities as its contents and hence has a Contents association. Typical being or article entities are Peers of each other within a space or room. Another aspect of this particular implementation is that entities are capable of containing one or more other article entities. While such a Container entity would also be a Peer of the other entities, it is assigned to an associational class Container to reflect its functionality.

Event notification methods are promulgated among the objects corresponding to the entities in a sequence based upon the associational relationships between the entities. For an event fired or triggered with regard to one of the entities within the virtual world environment, an event notification method is passed to any objects within any Container entity before event notification methods are promulgated to objects of other entities. An event notification method is then passed to objects within the object corresponding to the Content entity. Event notification methods are then passed successively to the objects corresponding to the Self and any Peer entities.

The updating of local object databases at client computers, dynamic inheritance, and event notification methods of this invention cooperate to provide a persistent object oriented multi-user domain capable of supporting multimedia presentation features for large numbers of users over conventional networks like the Internet. This includes distributing the objects of such a domain between a server and multiple clients and providing the objects with multimedia presentation features. Such a domain includes the persistence of conventional text-based MUDs and MOOs while also giving users the ability to vary or control a wide range of object attributes and properties. As a result, multimedia (e.g., graphical) presentation capabilities are combined with persistence and variability features of text-based MUDs and MOOs to provide a rich, dynamic, multimedia virtual world environment suitable for standard networks.

Figure 5:
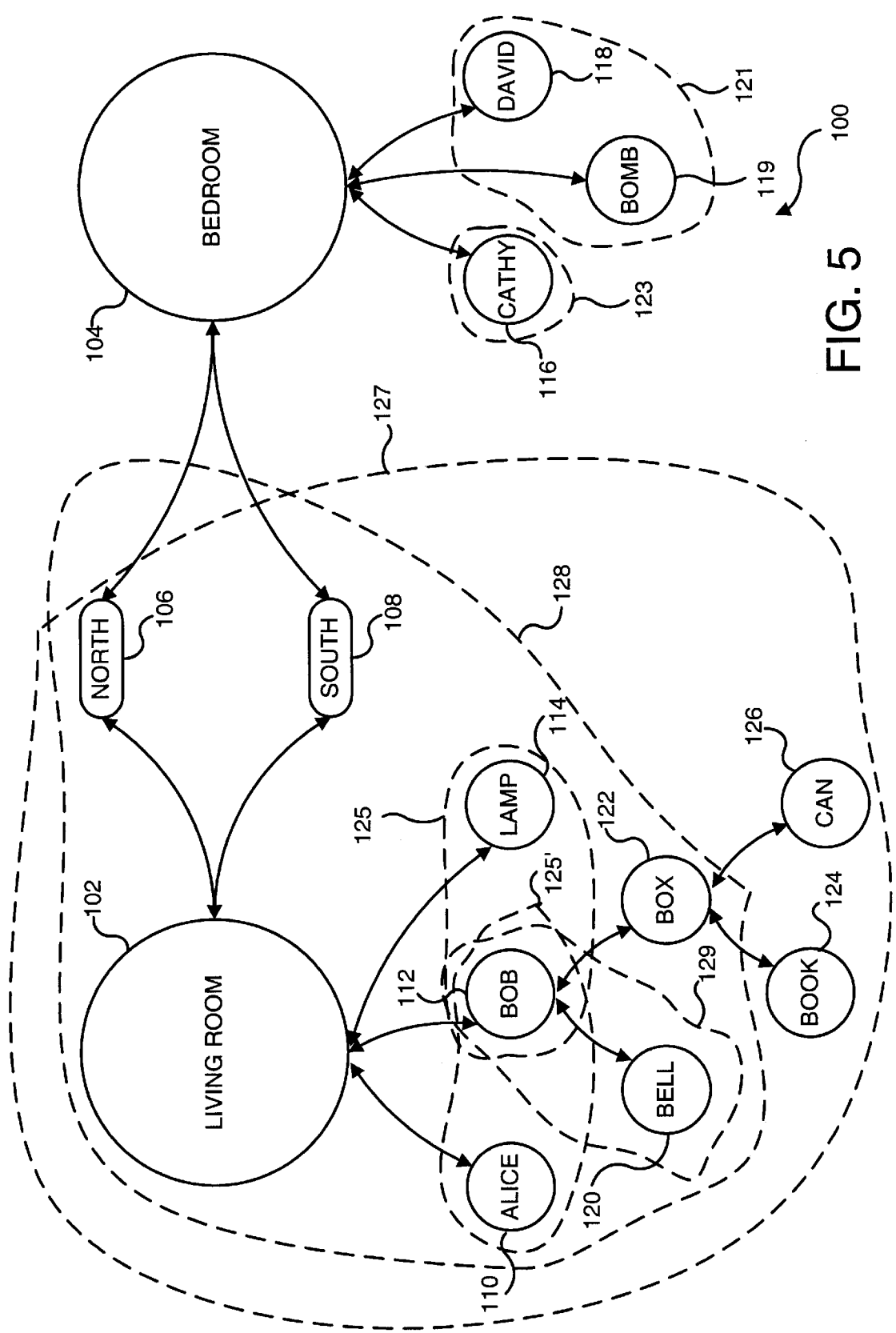
FIG. 5 is an exemplary view of a virtual world environment (VWE) illustrating one example of the divisions within the virtual world by rooms, perception regions, and bystander regions.

FIG. 5 is a block diagram illustrating an exemplary VWE 100. A living room 102 and a bedroom 104 are linked together by a north portal 106 and a south portal 108. These portals are associated with living room 102 and bedroom 104, so that an object entering a portal in a room will automatically be moved into the other room on the other side of the portal. Further, north portal 106 and south portal 108 are simultaneously contained in living room 102 and bedroom 104. Bedroom 104 contains a Cathy avatar 116, a bomb artifact 119, and a David avatar 118. Also, living room 102 includes other objects such as a lamp artifact 114, a bug artifact 123 (i.e., a microphone listening device), an Alice avatar 110, and a Bob avatar 112. Additionally, Bob avatar 112 is associated with a pair of artifacts, including a bell 120 and a box 122, which has the property of a closed container. Further, box 122 is associated with another pair of artifacts, specifically, a book 124 and a can 126.

A bystander region 128 is shown enveloping living room 102, Alice avatar 110, lamp 114, Bob avatar 112, north portal 106, south portal 108, bell 120, bug artifact 123, and box 122. Since box 122 is "closed" so that book 124 and can 126 contained within box 122 are not presently perceivable by Bob avatar 112, box 122 contains objects that may not affect Bob avatar 112. A change in an object that occurs within bystander region 128 may only be potentially "sensed" by client objects disposed therein, and the change can not be sensed by objects disposed outside the bystander region, such as book 124 and can 126. Thus, a local database update, which is explained in greater detail below, is only provided to each of those client computers 72 of users associated with objects, such as avatars, that may potentially "sense" the change and are disposed within the bystander region of the changed object.

The ability of an object to sense the changes in other objects that produce various types of data may depend upon the disposition of the sensing object in the VWE. For example, light produced by a lamp artifact may be sensed at a greater distance by an avatar disposed in a virtual open field than a sound produced by a bell artifact. Conversely, the sound may be more readily sensed by the avatar when it is positioned within a virtual structure that obstructs the light. Thus, separate boundaries for the perception region of the avatar may exist for various types of data produced by an object.

An exemplary auditory perception region extent 129 depicted in FIG. 5 contains an object (bell 120) that will be "heard" by Bob avatar 112 when the bell rings. A visual perception region extent 125 contains lamp 114, which is "seen" by Bob avatar 112 when Bob is oriented or facing towards the lamp. However, if the disposition of Bob avatar 112 changes so that Bob is oriented towards Alice avatar 110 and thus facing away from lamp 114, the perception region boundaries for Bob may change.

In this case, Bob avatar 112 may continue to sense the ringing of bell 120 (because auditory perception region extent 129 has not changed), but Bob may no longer be able to visually sense lamp 114. A new visual perception region extent 125' then applies. Although not shown, it is understood that another change in the location of Bob avatar 112 may enable Bob to visually perceive Alice avatar 110 and lamp 114, but be unable to sense the ringing of bell 120. Bell 120 would then be disposed outside the of the auditory perception region extent for Bob avatar 112 at the new location.

Also, it is further envisioned that yet another perception region extent would be provided for sensing force feedback effects (haptic feedback data) relative to objects disposed within the bystander region of objects. For example, an extent for force feedback perception region 121 is shown for David avatar 118 that includes bomb 119. Since the bomb is within the force feedback perception region of David avatar 118, the client (user) associated with the David avatar would be able to sense when bomb 119 explodes, e.g., if the user were manipulating a joystick to cause David avatar 118 to walk toward the exploding bomb, the force of the explosion would be experienced as a backward thrust on the joystick handle.

Force feedback output devices can provide a plurality of different types of tactile sensations (effects) that would simulate the percussive effects of an explosion. Also, a gradient for a force feedback perception region 121 may be provided to vary the intensity of the force feedback effects in relation to the distance between bomb 119 and other objects disposed in bedroom 104. Similarly, gradients may be provided for the visual and auditory perception regions associated with an object. It is important to note that bomb 119 is not within the force feedback perception region of Cathy avatar 116 and accordingly, the user associated with the Cathy avatar will not sense the force feedback effects associated with bomb 119. However, if the location of Cathy avatar 116 within bedroom 104 changes, the user associated with the Cathy avatar may be enabled to sense the effects of the explosion if the location of the bomb is within the force feedback perception region extent of the Cathy avatar at the new location of the avatar.

Further, the present invention enables a perception region associated with an object to have an extent that includes multiple objects disposed in multiple rooms. For example, FIG. 5 illustrates an auditory perception region 127 that is associated with Cathy avatar 116. The extent of auditory perception region 127 includes substantially all of the objects disposed within both living room 102 and bedroom 104, except for book 124 and can 126, which are positioned inside closed box 122. Further, Cathy avatar 116 is in communication with bug artifact 123, which enables Cathy avatar 116 to sense auditory data produced within living room 102 from a location inside bedroom 104.

If Cathy avatar 116 were not in communication with bug artifact 123, another auditory perception region 127' would be associated with Cathy avatar 116. The extent of auditory perception region 127' only includes objects disposed within bedroom 104. Similarly, David avatar 118 is in communication with bug artifact 123, which enables David avatar 118 to sense sounds produced inside living room 102 from a position within bedroom 104. Also, auditory perception region 127 is associated with David avatar 118 when bug artifact 123 is in communication with David avatar 118. Further, other auditory perception region 127' would be associated with David avatar 118 when bug artifact 123 is not in communication with David avatar 118.

Although bug artifact 123 is shown increasing the extent of a static (non-moving) auditory perception region associated with an avatar, it is also envisioned that a dynamic (moving) perception region could be provided for various data types. For example, a mobile object that could sense at least one type of data could be commanded to travel to various locations within the VWE and communicate data sensed at the locations to an avatar. Thus, the immediate disposition of the mobile object could dynamically change the perception region extent associated with the avatar for the type of sensed data provided by the mobile object.

Figure 6:
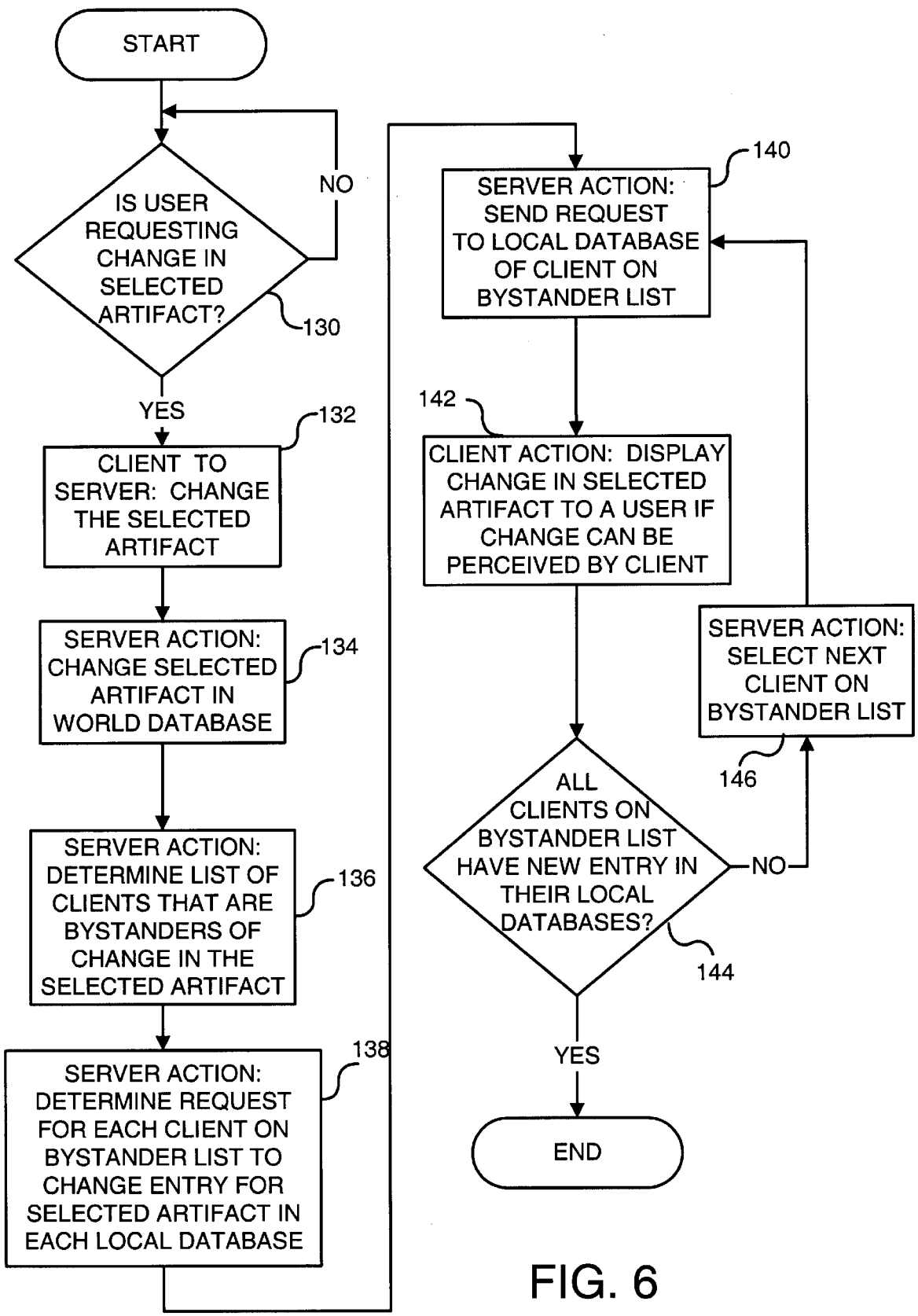
FIG. 6 is a flow chart providing an overview of the logic for updating a client's local database when a change occurs.

FIG. 6 is a flow chart illustrating the steps for updating a property of a selected artifact that has changed. Beginning with a start block, the logic flow advances to a decision block 130 and awaits a command by a user to change a property of a selected artifact. Once such a command is detected, the logic shifts to a block 132 in which the client requests that the server change a property of the selected artifact. The logic then advances to a block 134, which provides that the server change the property of the selected artifact in the world database. The world database contains all of the information required to represent all of the objects in the VWE.

After updating the world database, the logic flows to a block 136 in which the server determines a list of client computers of users that are bystanders of the change in the property of the selected artifact. In this example, the location property has not changed and the bystander clients are associated with objects that are avatars, which may at least be potentially affected by the change. Once the list of bystanders is determined, the logic moves to a block 138; this block indicates that the server makes requests to change at least one entry in each client's local database. The requests specify the change in the property of the selected artifact for each client on the list of bystanders.

After the requests are made, the logic advances to a block 140, and the server sends the request to change the local database entry to a client on the list of bystanders. The logic flow now moves to the client in a block 142. If the change in the property of the selected artifact is within the perception region of the avatar associated with the client that has received the request, the change will be displayed and/or produced by the client for its user.

The flow of logic continues with a decision block 144 that determines whether each of the clients on the list of bystanders has received a request to change the entry in their respective local databases. If so, the logic advances to an end block, and the updating of local databases is complete. However, if any bystanders (i.e., clients on the list of bystanders) remain that have not received a request, the logic moves to a block 146 and the server selects the next client on the list of bystanders. Once the next client is selected, the logic loops back through blocks 140, 142, and 144; the looping continues until all clients on the list of bystanders have received their requests. After the last client on the list of bystanders has received a request, the logic advances from block 144 to the end block.

Figure 7:
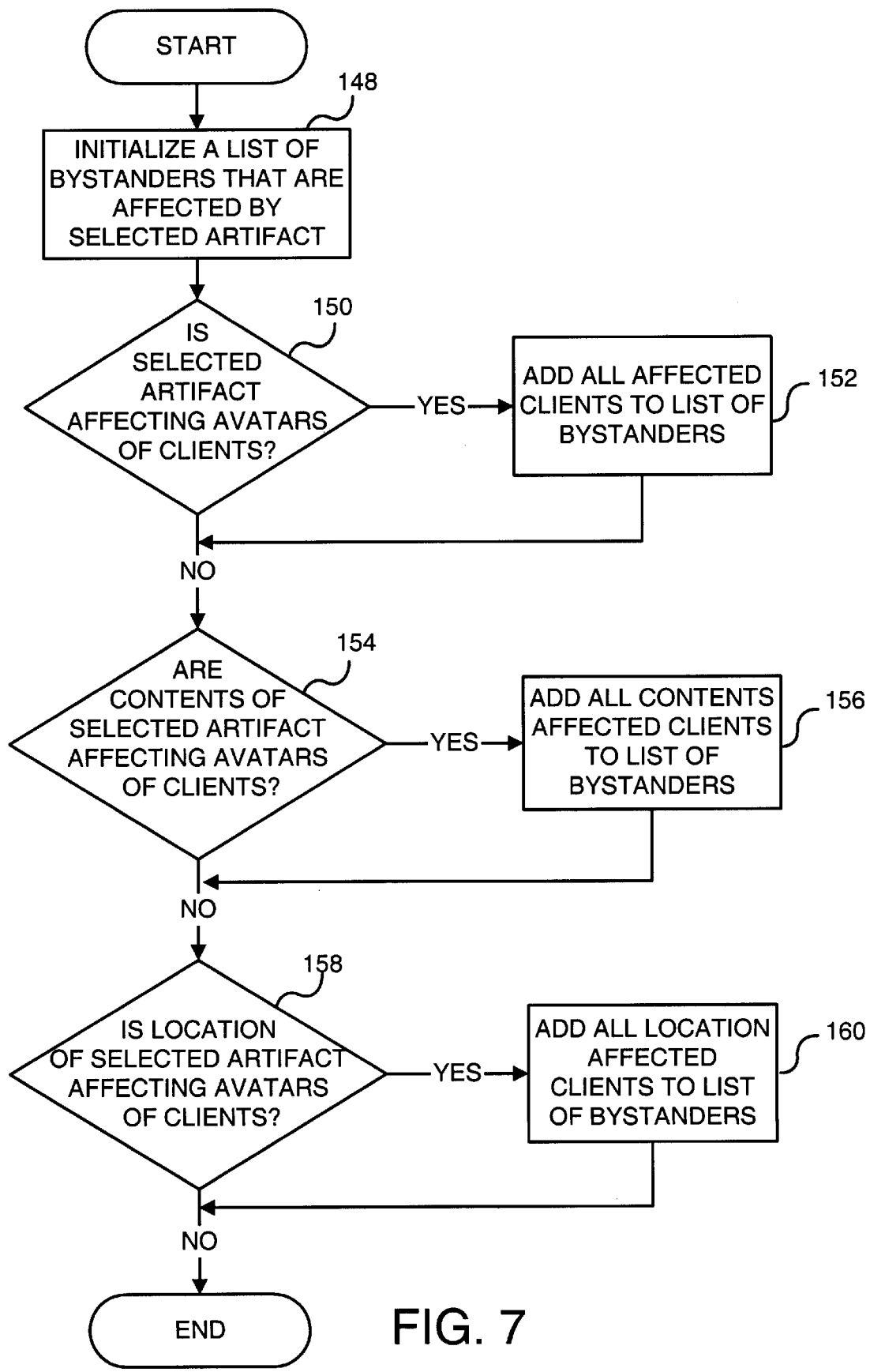
FIG. 7 is a flow chart showing the steps for determining the clients that are bystanders of a changed object.

The details of determining the client on the list of bystanders in block 136 of FIG. 6 are illustrated by the flow chart shown in FIG. 7. Moving from a start block to a block 148, the logic initializes a list for containing clients associated with avatars that are potentially or actually affected by a change to a property of the selected artifact. After initialization, the logic advances to a decision block 150, and a determination is made as to whether the change to the artifact affects the avatars of any clients, i.e., whether the change occurs within the perception region extent of the avatar associated with the client. For example, a selected artifact that is wielded as a weapon by an avatar against another avatar would be considered to actually affect the other avatar. If the determination in decision block 150 is positive, the logic steps to a block 152, and all clients actually affected by the change in the property of the artifact are added to the list of bystanders.

If the determination in block 150 is negative, or if block 152 is completed, the logic moves to a decision block 154, and a determination is made as to whether the contents of the artifact potentially or actually affect any client avatars. Interestingly, the contents of the selected artifact will not immediately affect any avatars unless the selected artifact represents a container that has the property of an open container, so that its contents are exposed. If the test in decision block 154 is true, the logic flows to a block 156, and all clients that are potentially or actually affected by the contents of the artifact are added to the list of bystanders. If the result in decision block 154 is false or if block 156 is already completed, the logic steps to a decision block 158.

In block 158, the logic determines if the location of the artifact potentially affects the avatars of any clients. If so, the logic proceeds to a block 160, and all clients that are potentially affected by the location of the selected artifact are added to the list of bystanders. However, if not, or if block 160 is already completed, then the logic advances to an end block, and the list of bystanders for changes in a selected artifact is complete.

Figure 8:
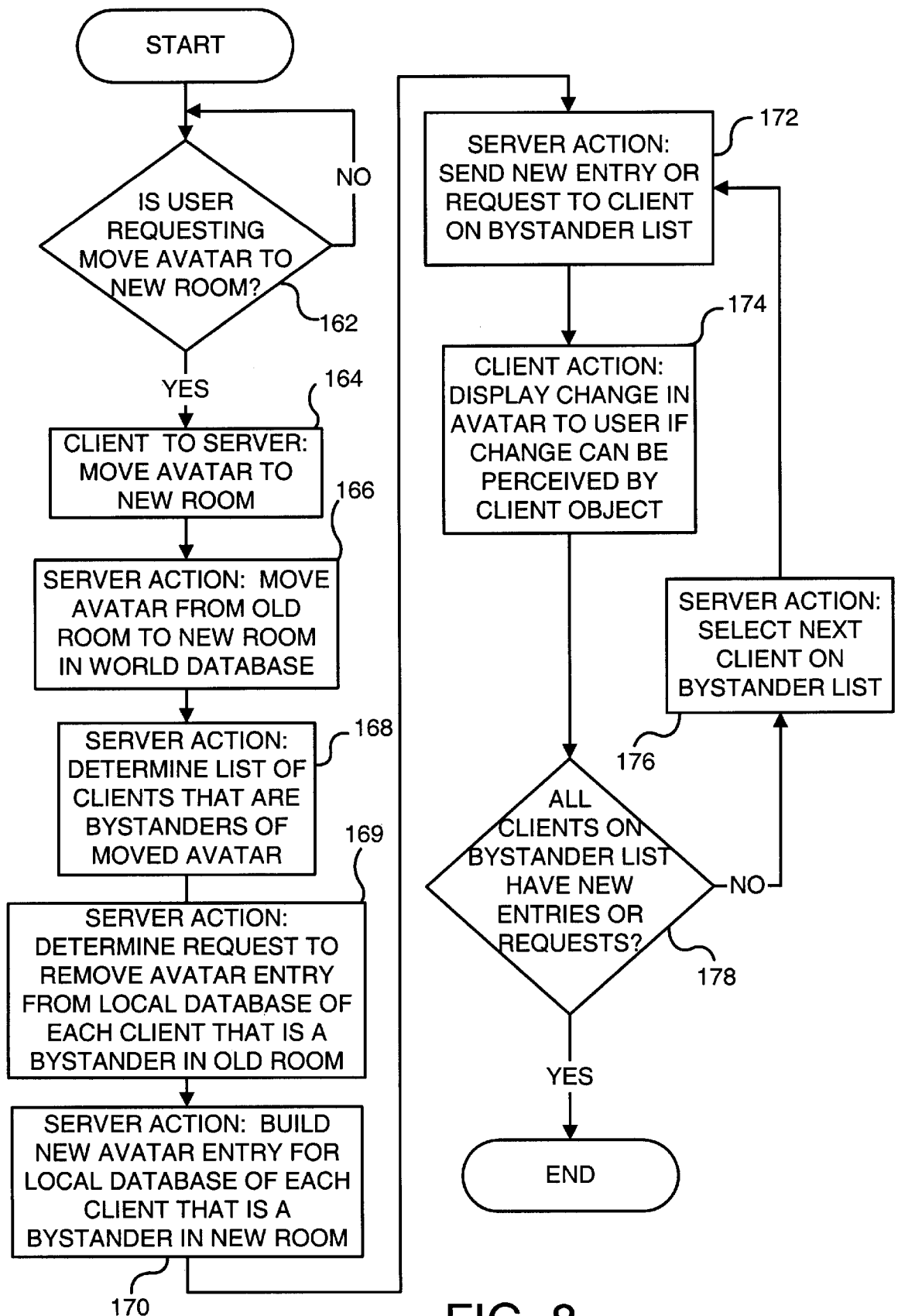
FIGS. 8, 9, and 10 are flow charts showing the steps for selectively updating a client's local database when an avatar moves from one room to another room.

In FIG. 8, a flow chart illustrating the logic implemented to move an object from one room to another room is shown. In this example, the moving object is an avatar that is associated with a client (user). However, substantially the same steps may be applied to move another type of object from one room to another room.

From a start block, the logic advances to a block 162 and waits for an instruction by the user to move an avatar to a new room, to be detected. Upon detection of the instruction, the logic advances to a block 164 in which the client sends a request to the server to move the avatar from one room to another room. After making the request, the logic flows to a block 166, where the server responds to the request to move the avatar to the new room by updating the virtual world database to reflect the change in the location of the avatar. Once the world database has been updated, the logic steps to a block 168 in which the server determines a list of clients that are bystanders of the moving avatar.

The logic flows to a block 169 and the server makes a request of those clients on the bystander list that are not bystanders in the new room for the moved avatar. The request instructs these clients to remove the entries for the moving avatar from their local databases. The logic steps to a block 170 and the server builds new local database entries for each object that is a bystander of the moved avatar in the new room. After the entries are built, the logic moves to a block 171, and the server sends new local database entries to the client of the moved avatar for each object that is a bystander of the moved avatar in the new room.

Next, the logic advances to a block 172 in which the server builds new entries for the local databases of every client on the list of bystanders that are bystanders in the new room for the moved avatar. Once the new entries are added, the logic flows to a block 173, and the server sends either a new entry to a local database of a client on the list that is a bystander in the new room, or else a request to a client on the list that is a bystander in the old room. After sending the new entry or request, the logic advances to a block 174, which indicates that the client will display the change in the location of the moved avatar to the user if the moving avatar is within a perception region extent of another object associated with the client, such as another avatar.

Next, the logic moves to a decision block 178 to determine if all of the clients on the list of bystanders have received a new entry or request. If not, the logic proceeds to a block 176 in which the server selects the next client on the list of bystanders, and the logic loops back to implement the steps of blocks 172, 174, and 178 again. The looping through these steps continues until the test at decision block 178 is affirmative; then, the logic advances to an end block. Upon reaching the end block, all of the clients on the list that are bystanders of the avatar in the new room will have received new entries in their local databases to indicate the change in the location of the moved avatar. Also, all of the other clients on the list that were bystanders of the avatar in the old room, will have received requests to remove the avatar entry from their local databases.

Figure 9:
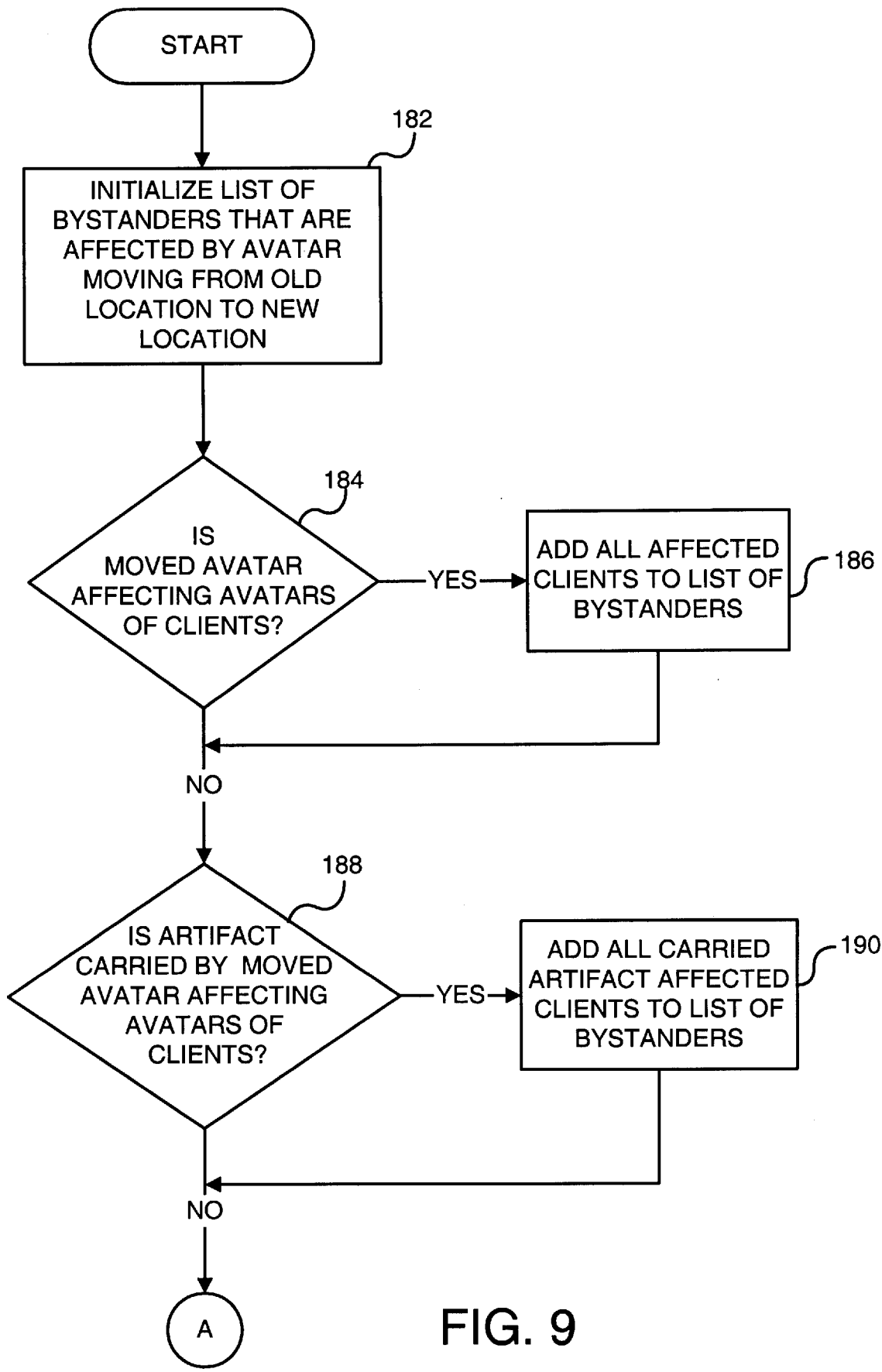
Figure 10:
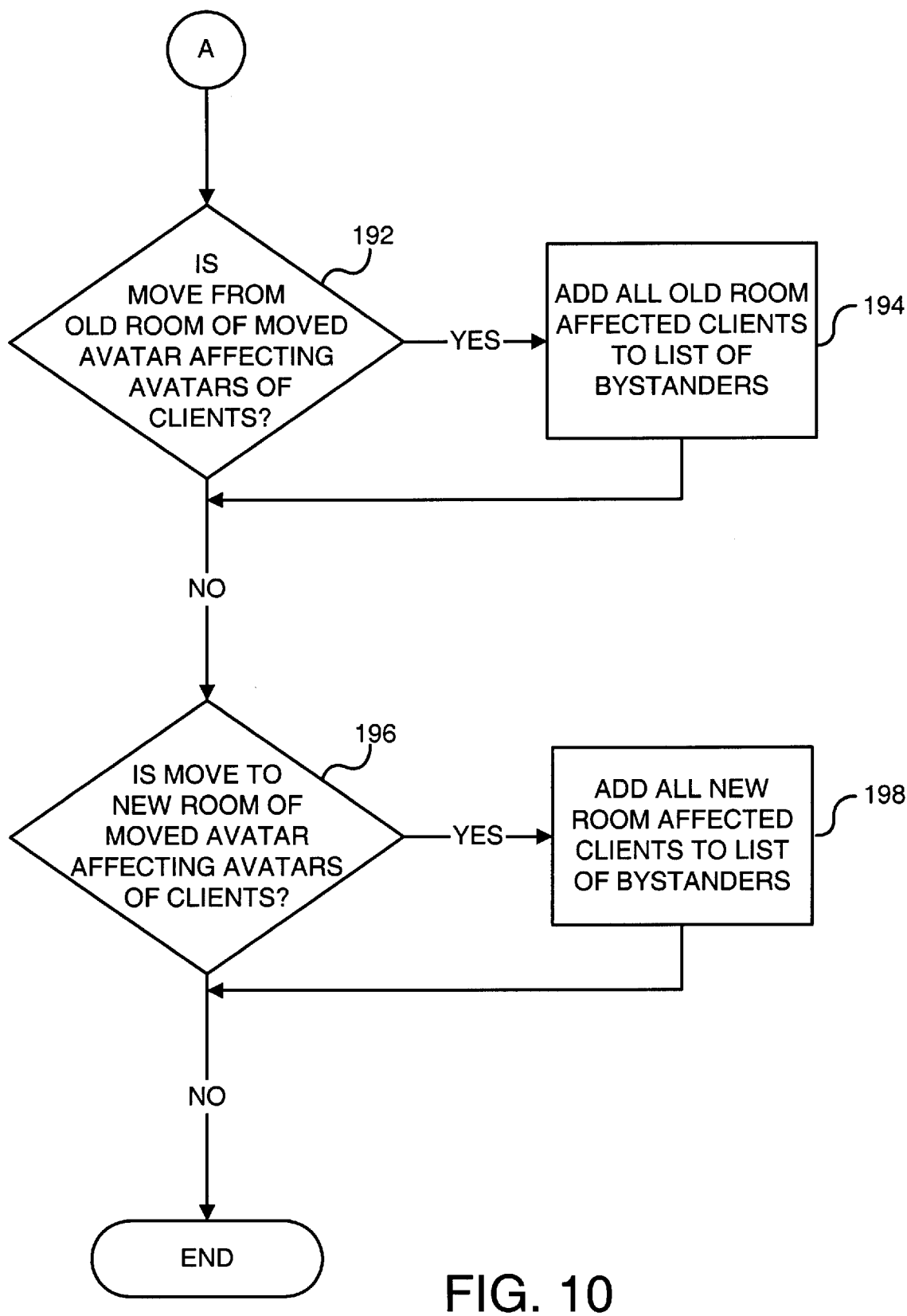

A more detailed description of the steps involved in determining the bystanders in block 168 of FIG. 8 is provided by the flow chart shown in FIGS. 9 and 10. From a start block, the logic advances to a block 182, initializing a list of clients that are potentially or actually affected by an avatar moving from one room to another room. After this initialization, the logic advances to a decision block 184 to determine if the moving avatar may affect the avatars of other clients, i.e., whether the moving avatar has entered into, or alternatively, out of the perception regions associated with the other clients' avatars.

If so, the logic steps to a block 186, and all potentially or actually affected clients are added to the list of bystanders. If not or if the logic flow has otherwise advanced to block 186, the logic proceeds to a decision block 188 to determine if an artifact carried by the moving avatar may affect any other client avatars. If so, the logic flows to a block 190, which provides that all clients potentially or actually affected by the artifact carried by the moving avatar are added to the list of bystanders. All artifacts wielded by the moving avatar are considered to be carried, and the determination at block 188 is performed accordingly.

If the result of decision block 188 is negative or if the logic has previously advanced to block 190, the logic advances to a decision block 192, which is shown in FIG. 10. In decision block 192, the logic determines whether the move by the avatar from the room previously occupied affects any other client avatars disposed in that room, i.e., prior to the move, determines whether the moving avatar was disposed in the bystander region of the other client avatars in the old room.

If so, the logic proceeds to a block 194 in which all clients that are potentially or actually affected by the avatar moving from the previously occupied room to the new room are added to the list of bystanders. These clients are also designated as bystanders in the old room for the moving avatar. A negative determination in block 192 or the completion of block 194 leads to a decision block 196, to determine if the move by the avatar to another room affects any other avatars disposed in the new room, i.e., to determine if the moving avatar is disposed in the bystander region of the other client avatars in the new room. If affirmative, the logic steps to a block 198 so that all clients for avatars in the new room that are potentially or actually affected by the move to the new room are added to the list of bystanders. Further, these clients are designated as bystanders in the new room for the moving avatar. However, if the determination is negative or if block 196 has been completed, the logic continues to an end block and returns to the main logic flow shown in FIG. 8.

Figure 11:
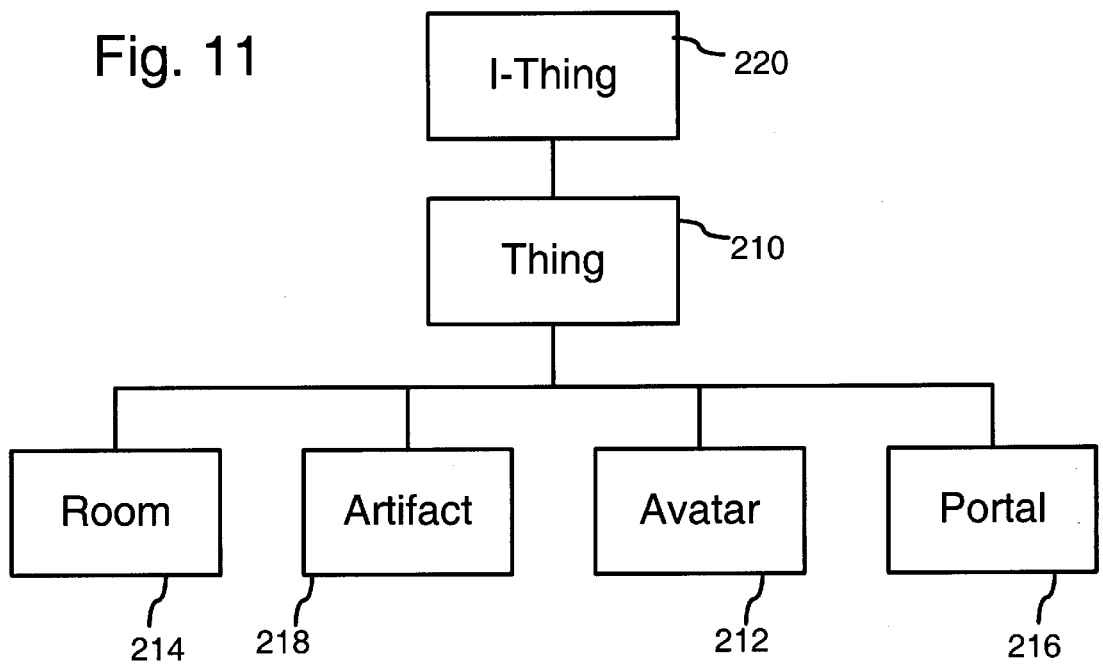
FIG. 11 is a block diagram representing hierarchical inheritance relationships between an exemplary set of objects.

FIG. 11 is a block diagram illustrating hierarchical inheritance relationships between an exemplary set of objects 210–218 corresponding to entities 90–98 of FIG. 4 and representing abstractions that include data and the operations associated with that data. Entities 90–98 are represented by instances of objects 210–218 of an interactive virtual world environment and correspond to particular types of entities or articles within the environment. Objects 210–218 have hierarchical inheritance relationships between them that may be used to extend the latebound event mechanism, as described below in greater detail. Objects 210–218 are based upon an interface 220 (designated I-Thing) that in one implementation is a COM object interface. It will be appreciated, however, that I-Thing interface 220 could alternatively be implemented according to other object models.

Objects 210–218 are the basic objects or types from which other objects inherit services and are called the exemplars for the virtual world environment or representation. Object 210 (designated Thing) is the root or core of the set of all interfaces in the representation. Object 212 (designated Avatar) represents an avatar corresponding to a real person (e.g., the user) or a virtual person in the world. Object 214 (designated Room) and object 216 (designated Portal) represent and define the topology of the world as locations (i.e. rooms) and passageways (i.e., portals) between the rooms. Object 218 (designated Artifact) represents articles that are or may be manipulated by any of users via their avatars. It will be appreciated, however, that this illustration does not limit the applicability of dynamic inheritance between objects to a virtual world environment and that dynamic inheritance of this invention can be used with objects for other representations, models, or schemes.

Figure 12:
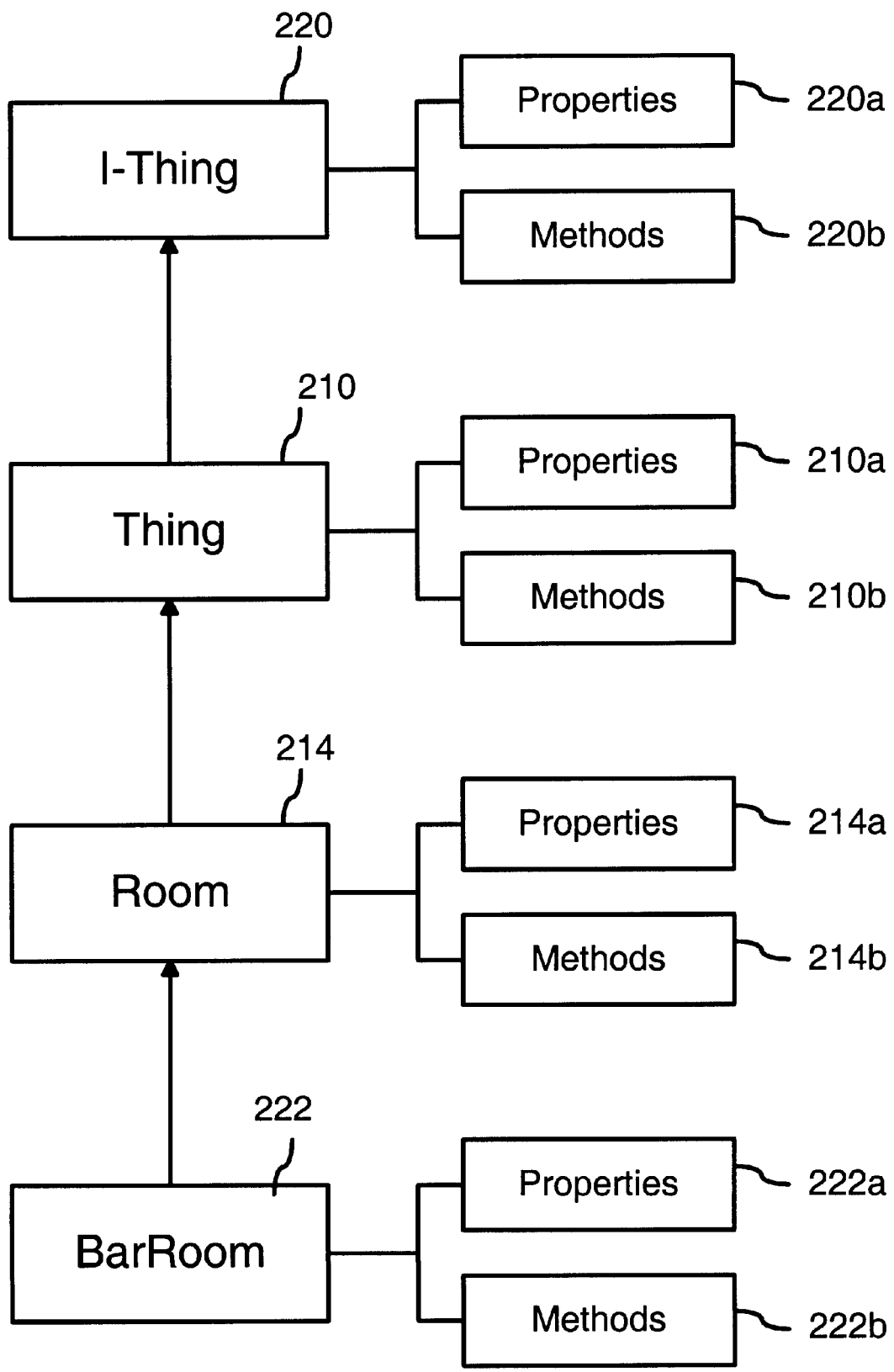
FIG. 12 is a block diagram illustrating a sequence of hierarchical inheritance relationships.

FIG. 12 is block diagram illustrating a sequence of hierarchical inheritance relationships between Thing object 210, exemplar Room object 214, and one example of a particular room object 222 designated BarRoom. Objects 210, 214, and 222 include the characteristics described with reference to objects 56 of object 50 which characteristics are represented as properties 210a, 214a, and 222a and methods 210b, 214b, and 222b, respectively. Thing object 210 is the root or parent exemplar of the set of objects and is the direct exemplar to Room object 212. Room object 212 is the direct exemplar to BarRoom object 222, which represents a particular room in the virtual world environment.

Thing object 210 defines properties 210a and methods 210b shared by all other objects in the representation or virtual world environment, including exemplars 212–220 and particular object 222. Properties 210a include for a particular object an exemplar property that refers to the exemplar or parent of the particular object, a name property that lists the name of the particular object, and a description property that includes a text description of the particular object.

Properties 210a also include a geometry property that associates a geometric model for representing the object, a location property that defines a location object in the virtual world environment with or in which the particular object is positioned, a contents property that lists objects "contained" by the particular object, and an owner property that identifies a user that the "owns" the particular object.

As utilized in the exemplary virtual world environment, methods 210b include a MoveTo method for changing the room the particular object is in and a Tell method by which one object passes information to another. It will be appreciated, however, that other methods particular to a virtual world environment could be included in methods 210b and that different applications could use entirely different methods.

Room object 214 defines additional properties 214a and methods 214b shared by lower level objects in the virtual world environment, including object 222. Properties 214a include for a particular object an exit property indicating an exit from the room and an entrance property indicating an entrance into the room. Methods 214b include an announce method for broadcasting information to others in the room. BarRoom object 222 defines properties 222a and methods 222b, including a bartender property designating an avatar for hosting the room, a recipes property designating refreshments available in the room, an orderdrink method by which a user requests a refreshment from the bartender, and a requestmusic method by which a user requests a music selection.

Properties and methods are associated with object interfaces during a design time phase when a developer creates them. The interfaces of objects defined under the component object model, for example, cannot be modified after the interfaces have been established, distributed, or promulgated. New functionality or other modifications typically are applied by adding a new interface at a design time phase. Interfaces are fixed or static during a run-time phase when the interfaces are used by or executed on behalf of a user.

Figure 13:
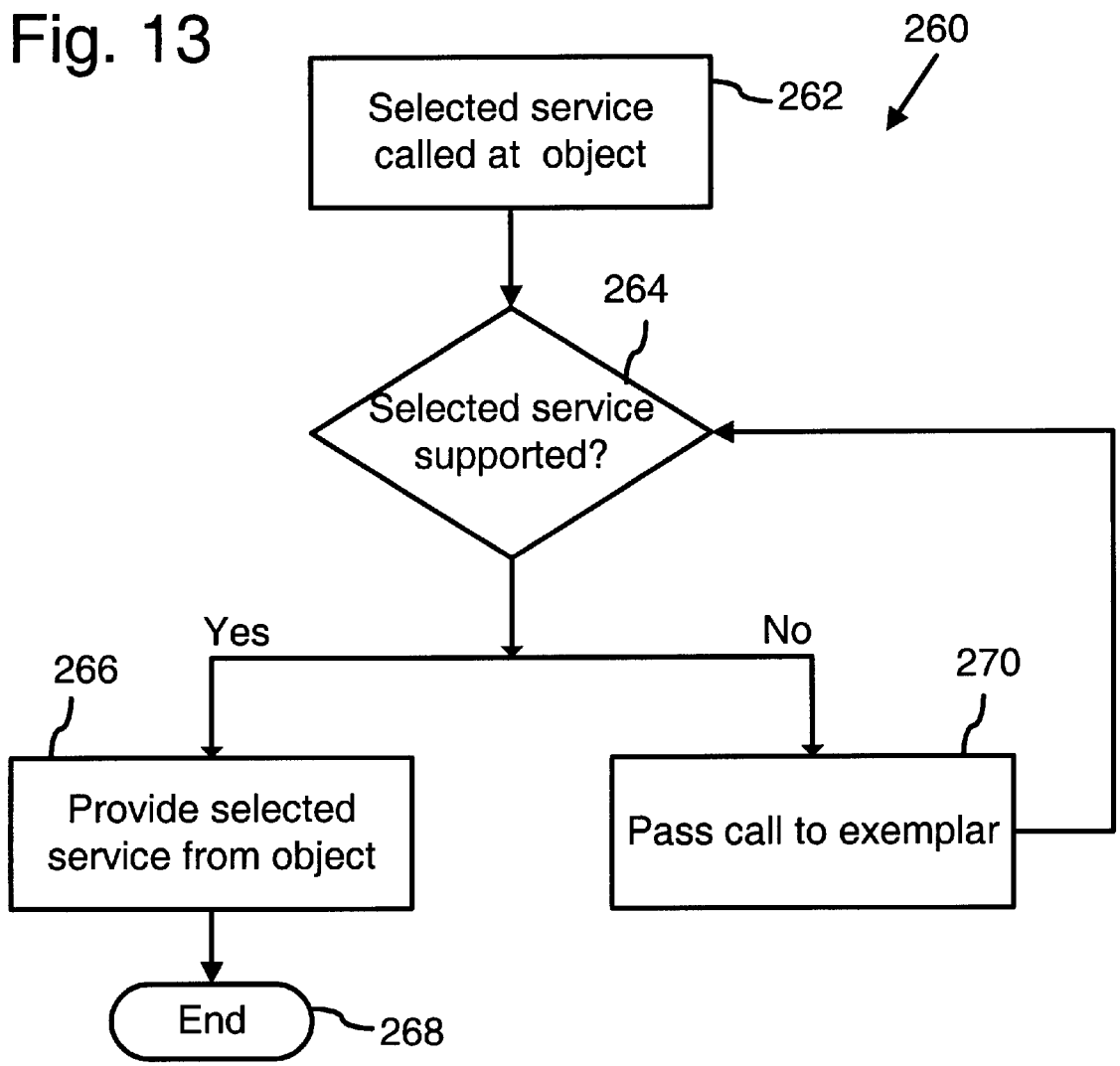
FIG. 13 is a flow diagram illustrating a hierarchical inheritance process.

FIG. 13 is a flow diagram illustrating a dynamic inheritance process 260 as a run-time use of objects. For purposes of illustration, dynamic inheritance process 260 is described with reference to the sequence of hierarchical inheritance relationships shown in FIG. 12.

Process block 262 indicates that a reference or call is made to a selected service (e.g., a property or a method) at a selected object (e.g., object 222), thereby making the selected object the current object. The reference or call may be made in the conventional manner that properties and methods of an object are referred to or called.

Query block 264 represents a query as to whether the current object receiving the reference or call (e.g., object 222) supports the selected property or method. Whenever the current object (e.g., object 222) supports the selected property or method, query block proceeds to process block 266. Otherwise, query block 264 proceeds to process block 270.

Process block 266 indicates that the selected property or method is provided by the current object. Process block 266 proceeds to termination block 268.

Process block 270 indicates that the reference or call to the selected property or method is passed to the direct exemplar of the current object (e.g., object 214) and the direct exemplar is redesignated the current object. Process block 270 returns to query block 264.

Process 260 provides a mechanism for dispatching properties and methods to exemplars. Process 260 supports dynamic inheritance of other properties and methods at run-time by allowing intervening exemplars to be added to a hierarchy of objects.

In one implementation I-Thing interface 220 also defines, supports, or implements methods 220b that include the dynamic inheritance methods set forth in Table 1. Methods 220b in Table 1 are available to each object of which I-Thing interface 220 is the root exemplar (e.g., objects 210–218 and 222).

TABLE 1

| Name | Action |
| --- | --- |
| AddMethod | Adds a designated method to make the method available to the object |
| RemoveMethod | Removes a designated method to make the method unavailable to the object |
| AddProperty | Adds a designated property to make the property available from the object |
| RemoveProperty | Removes a designated property to make the property unavailable from the object |
| GetMethod | Returns a designated method including the number and types of the method parameters |
| GetProperty | Returns a designated method including the number and types of the property parameters |
| PutMethod | Puts a designated value or designated values in the parameters of a designated method. |
| PutProperty | Puts a designated value or designated values in the parameters of a designated property |
| InvokeMethod | Invokes a designated method |

For example, methods and properties available for implementation or access by the dynamic inheritance methods of I-Thing interface 220 are in a dynamic inheritance listing, such as a table, that indicates the names of the methods and properties, defines the services they provide, and includes unique identifiers for them. The unique identifiers may be of the form of integer values like the dispatch identifiers (DISPIDs) used with the dispatch interface of the IDispatch interface used in COM automation.

The AddMethod and the AddProperty methods allow methods and properties, respectively, to be added to the dynamic inheritance listing so that the listing may be modified during run-time. These methods pass the name and a definition of the method or property to be added to the dynamic inheritance table and assign a corresponding unique identifier for the method or property. The RemoveMethod and the RemoveProperty methods remove methods and properties from the dynamic inheritance listing. The InvokeMethod method allows a user to execute the designated method. The GetMethod and the GetProperty methods return the designated method and property, respectively, from the dynamic inheritance listing. The PutMethod and the PutProperty methods allow a user to set the method or property.

The dynamic inheritance methods of Table 1, as well as the dynamic inheritance process 260 of FIG. 13, allow methods and properties to be dynamically added to or changed within otherwise conventional static interfaces. The adding of the methods and properties includes accessing information about the methods and properties, setting values in and retrieving values from them, and invoking the methods. Methods and properties may be added in effect by accessing them from an exemplar to a particular interface or object according to dynamic inheritance process 260. In addition, methods and properties may be added by adding them to the set of methods and properties available at an exemplar, such as the root exemplar I-Thing.

These features allow inheritance to be dynamic and provide a seamless scripting environment in programmable applications like virtual world environments. Moreover, the dynamic inheritance methods of Table 1 and dynamic inheritance process 260 of FIG. 13 may be used together as described hereinabove, or either may be used alone to provide dynamic inheritance functionality.

The dynamic inheritance method InvokeMethod is similar to the Invoke method of the IDispatch interface used in COM automation. The IDispatch::Invoke method allows a software client to invoke a designated software method available from another application. The methods available from the other application are specified in a dispatch interface (often called a dispinterface). Dispatch identifiers (DISPIDs) identify the available methods. The similarity between the dynamic inheritance of this invention and the IDispatch interface used in COM automation extends no farther.

The dynamic inheritance of this invention allows methods and properties to be added to or removed from the set of available methods and properties. In contrast, IDispatch interface used in COM automation is a conventional COM interface and is immutable once it has been established. Methods and properties are not added to an IDispatch interface after it has been established. It will be appreciated, therefore, that changing the methods and properties available to an interface like the I-Thing interface 100 after it has been established is a major improvement upon the prior functionality of objects with fixed interfaces (e.g., COM objects) like the IDispatch interface.

Figure 14:
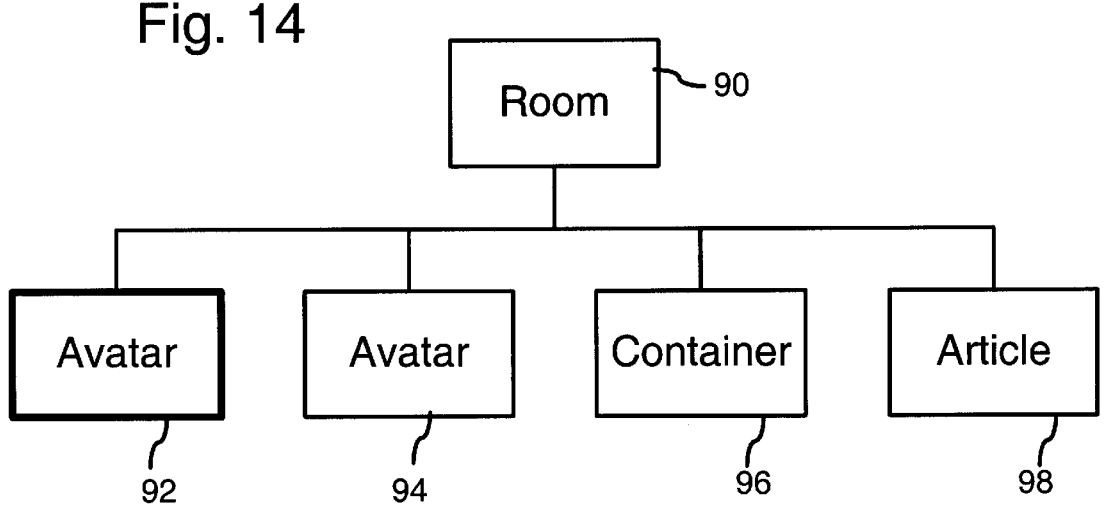
FIG. 14 is a block diagram illustrating associational relationships between entities within the virtual world environment.

FIG. 14 is a block diagram illustrating associational relationships between the virtual space or room 90 and entities 92–98 of FIG. 4. The associational relationships primarily represent the physical or corporeal distinctions between entities and order them according to the associations Self, Contents, Peer, or Container. Each of entities 92–98 is its own Self relative to and separate from other entities. Avatar 92 is shown with highlighting to illustrate its Self association, as explained below with reference to FIG. 15. Room 90 has entities 92–98 as its contents and hence has a Contents association. Avatars 92 and 94 and article 98 are Peers of each other within room 90. While entity 96 is also a peer of the other entities, it is assigned to an associational category Container because it contains one or more other entities (not shown) despite not being an area or room.

Figure 15:
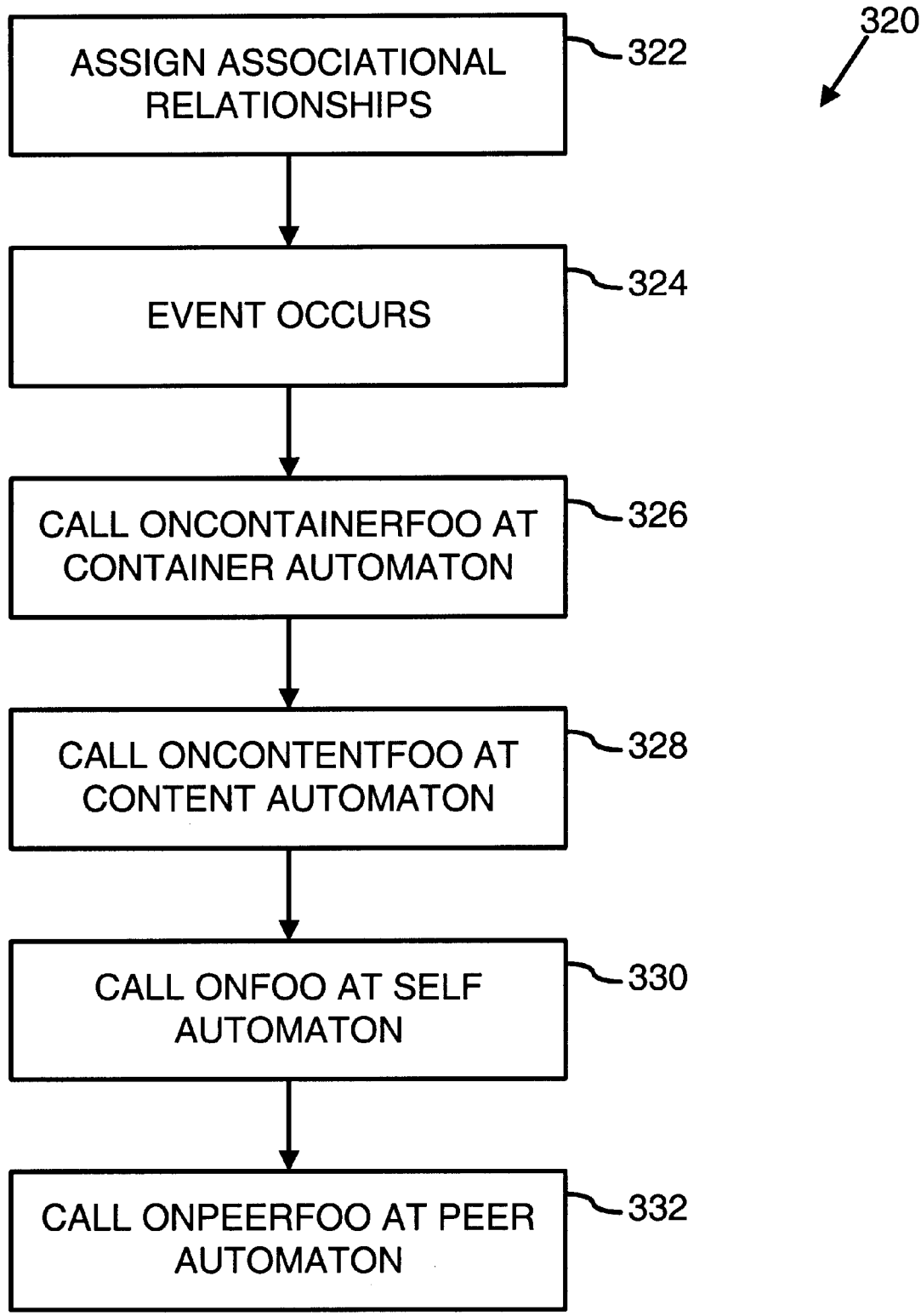
FIG. 15 is a flow diagram illustrating a latebound event mechanism process in which event notifications and associated methods may be promulgated among objects in a dynamic, run-time manner.

FIG. 15 is a flow diagram illustrating a latebound event mechanism process 320 in which event notification methods are promulgated among objects corresponding to entities 90–98 in a latebound, dynamic, run-time manner. For purposes of illustration, dynamic event mechanism process 320 is described with reference to the associational relationships shown in FIG. 14 and the hierarchical relationships shown in FIG. 11.

Process block 322 indicates that the entities and their corresponding objects within the virtual world environment are assigned associational relationships such as those shown in FIG. 14. It will be appreciated that these relationships are illustrative and that the present invention may be applied to other associational relationships and to applications other than a virtual world environment.

Process block 324 indicates that an event occurs or is "fired" with regard to one of the entities within the space in the virtual world environment. In one implementation, a FireEvent method invoked at object 212 corresponding to avatar 92 to initiate the event. The FireEvent method passes the name of the event and any required parameters. With reference to the illustration in FIGS. 4 and 14, for example, the event occurs with reference to avatar 92 and is a Tell event in which avatar 92 passes information or tells something to other entities in room 90. The FireEvent method may be executed either directly through the object (e.g., object 212) as a conventional defined object method or may be executed indirectly through a dynamic inheritance process described below in greater detail.

Process block 326 indicates that an event notification method (e.g., OnContainerFoo) is called at any object within any container entity that is within the virtual world space. In this example, the OnContainerTell method is called on objects (not shown) within object 218 corresponding to container 96. The OnContainerTell method may be executed either directly through the contained objects as a conventional defined object method or may be executed indirectly through the dynamic inheritance process described below.

If it is supported directly or indirectly, the OnContainerTell method or any other OnContainerFoo method provides a functional result at any object contained within a container entity (e.g., 96). Execution of any OnContainerFoo method prior to other event notification methods is desireable because of the potential otherwise for OnContainerFoo methods to have unpredictable results on entities contained within a Container entity. In this regard, objects within container entity 96 receive early notification in recognition of their unique association with respect to container entity 96.

Process block 328 indicates that an event notification method (e.g., OnContentFoo) is called at any object within the object of any space entity within which the event is fired. In this example, the OnContentTell method is called on objects corresponding to entities 92–98 the are the contents of object 214 corresponding to room 90.

The OnContentTell method may be executed either directly through the contents objects within object 214 as a conventional defined object methods or may be executed indirectly through the dynamic inheritance process described below. If it is supported directly or indirectly, the OnContentTell method or any other OnContentFoo method provides a functional result at objects or entities that are the contents of the room entity (e.g., 90) within which the event occurs. This functional result further reflects the propagation of the causal effect of the event.

Process block 330 indicates that an event notification method (e.g., OnFoo) is called at the object of the entity for which the event is fired, where "Foo" is the name of the event. In this example, the OnTell method is called at object 212 corresponding to avatar 92. The OnTell method may be executed either directly through the object (e.g., object 212) as a conventional defined object method or may be executed indirectly through a dynamic inheritance process described below.

If it is supported directly or indirectly, the OnTell method or any other OnFoo method provides a functional result at the "acting" entity 92 with which the triggering event (e.g., Tell) is associated. Providing the first event notification method at Self entity 92 provides an initial causal effect to be associated with the entity that the event is associated with.

Process block 332 indicates that an event notification method (e.g., OnPeerFoo) is called at the object of any other entity that is also contained in the space entity that contains the entity for which the event is fired. In this example, avatar 94 and articles 96 and 98 are in room 90 with, and hence peers of, avatar 92. The OnPeerTell method is called on the interfaceobjects 212 and 218 corresponding to avatar 94 and articles 98 and 96.

The OnPeerTell method may be executed either directly through the object or objects (e.g., objects 212 and 218) as a conventional defined object method or may be executed indirectly through the dynamic inheritance process described below. If it is supported directly or indirectly, the OnPeerTell method or any other OnPeerFoo method provides functional results at the entities other than room 90 and self entity 92. These functional results reflect the conclusion of the propagation of the causal effect of the event throughout room 90.

Event mechanism process 320 provides notifications of events among objects according to their associational relationships. The OnFoo method at process block 326 represents a "first person" or "actor" event notification method that is called at an object corresponding to the entity with which an event is associated. The OnContentFoo method at process block 330 represents an area event notification at an entity containing the entity with which the event is associated. The OnPeerFoo method at process block 332 represents the final propagation of an event notification through an associated set of entities. This event notification sequence that represents the propagation of causal effects from an event and thereby provides an improved representation of a virtual world environment.

Event mechanism process 320 of FIG. 15 has been described as utilizing a dynamic inheritance process, which is described below. It will be appreciated, however, that utilizing the dynamic inheritance process in connection with event mechanism process 320 is but one implementation of this invention. In a alternative implementation, for example, event mechanism process 320 could be utilized with the dynamic inheritance process.

The preferred embodiment of the claimed invention is a graphically rendered 3D VWE that includes various artifacts and avatars that may be associated with clients/users. The artifacts and avatars are disposed within an interconnected set of rooms. Further, objects such as avatars and/or artifacts may move through the portals connecting rooms, so that the entire length and breadth of the VWE may be explored by the clients associated with the objects. Also, the VWE may include some rooms having interactive games, puzzles, and/or informational resources that may be perceived by the users of avatars that are visiting those rooms. Furthermore, updates for a change in the VWE are only provided to those clients of a user that have an avatar disposed inside the bystander region associated with the change.

Another embodiment of the present invention entails graphically rendering a series of 3D chat rooms that are linked by portals in which participants of the chat session are represented by avatars. Each avatar is graphically rendered using a set of properties that are stored within the local database of at least one client or user represented by the avatar. The typical premise of a chat room is that a user represented by an avatar in the chat room can communicate with the other users represented by other avatars disposed within the same chat room. Local database updates are only provided to those clients having avatars positioned within the bystander region of a change in the VWE. Accordingly, the present invention is used as discussed above to handle a large number of users involved in a VWE chat session, but employs substantially less data transmission over the network and requires substantially less computational resources to respond to changes in the VWE than are required by the prior art techniques.

Another contemplated embodiment of the present invention employs a client to produce a display that selectively depicts a plurality of perception regions to a user. The perception regions do not necessarily correspond to the boundaries of perception and/or bystander regions for an object that is associated with the client employed by the user to produce the display. Instead, the user can selectively employ perception regions that are associated with other objects for portraying variously sized regions of the VWE. These perception regions can be selected to display various activities and/or locations within the VWE.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. In a persistent object oriented multi-user domain in which objects are distributed between computer readable media associated with a server computer and plural client computers with corresponding users, the improvement comprising:

multimedia properties associated with objects in the multi-user domain for presentation on the client computers; and a bystander region property associated with selected ones of the objects and representing a perceptual range of effect on other objects of multimedia properties on the selected objects.

2. The domain of claim 1 in which ones of the selected objects are associated with ones of the users and are maintained on the client computers corresponding to those users and in which the selected objects have bystander region properties.

3. The domain of claim 1 further including software instructions for adding a designated method or property at run-time to a designated one of the objects.

4. In a persistent object oriented multi-user domain in which objects are distributed between computer readable media associated with a server computer and plural client computers with corresponding users, the improvement comprising:

multimedia properties associated with objects in the multi-user domain for presentation on the client computers;

objects in the domain providing services in response to calls and including indications of hierarchical relationships between the objects such that each object references or is referenced by another object;

software instructions for determining in response to a call to a selected service at a selected object whether the selected service is available from the object; and software instructions for passing the call to a referenced object that is referenced by the selected object according to at least one of the hierarchical relationships if the selected service is unavailable at the selected object.

5. The domain of claim 4 in which the objects include a root object that is referenced by at least one other object, but does not reference another object.

6. The domain of claim 4 in which the objects represent entities within a virtual world environment and in which the objects further comprise indications of associational relationships between the entities representing corporeal distinctions between the entities within the virtual world environment.

7. The domain of claim 6 further comprising software instructions for promulgating event notification methods among the objects corresponding to the entities in a sequence based upon the associational relationships between the entities.

8. The domain of claim 6 in which the associational relationships between the entities include Self, Peer, and Contents relationships.

9. A computer-readable medium having stored thereon software instructions for a virtual world environment maintained on a server computer that is in concurrent communication with plural client computers, each of the client computers having an associated object representing an entity in the virtual world environment, comprising:

software instructions for maintaining a world object database on the server computer, the world object database including plural software objects that provide services in response to calls and correspond to entities within the virtual world environment;

software instructions for concurrently delivering to the client computers local object databases that are subsets of the world object database, each local object database at a client computer including the associated object for the client computer and other objects within a bystander region for the associated object, the bystander region representing a perceptual range of effect on other objects of multimedia properties on the selected objects; and multimedia properties for at least selected objects in the local object databases for concurrently presenting the corresponding entities on the client computers in a format other than text.

10. The medium of claim 9 further comprising indications of hierarchical relationships so that each associated object references at least one other object;

software instructions for determining in response to a call to a selected service at a selected one of the associated objects whether the selected service is available from the object; and software instructions for passing the call to a referenced object that is referenced by the selected object according to a hierarchical relationship if the selected service is unavailable at the selected object.

11. A computer-readable medium having stored thereon software instructions for a virtual world environment maintained on a server computer that is in concurrent communication with plural client computers, each of the client computers having an associated object representing an entity in the virtual world environment, comprising:

software instructions for maintaining a world object database on the server computer, the world object database including plural software objects corresponding to entities within the virtual world environment;

software instructions for concurrently delivering to the client computers local object databases that are subsets of the world object database;

multimedia properties for at least selected objects in the local object databases for concurrently presenting the corresponding entities on the client computers in a format other than text; and in which the objects represent entities within the virtual world environment and in which the objects further comprise indications of associational relationships between the entities representing corporeal distinctions between the entities within the virtual world environment, the associational relationships between the entities including Self and Contents relationships.

12. The medium of claim 11 further comprising:

indications of hierarchical relationships so that each associated object references at least one other object;

software instructions for determining in response to a call to a selected service at a selected one of the associated objects whether the selected service is available from the object; and software instructions for passing the call to a referenced object that is referenced by the selected object according to a hierarchical relationship if the selected service is unavailable at the selected object.

13. The medium of claim 11 further comprising software instructions for promulgating event notification methods among the objects corresponding to the entities in a sequence based upon the associational relationships between the entities.

* * * * *